(12) United States Patent
Nakayama et al.

(10) Patent No.: US 7,951,737 B2
(45) Date of Patent: May 31, 2011

(54) ALUMINUM OXIDE-BASED COMPOSITE SINTERED BODY AND CUTTING INSERT

(75) Inventors: Hiroko Nakayama, Komaki (JP); Kazuhiro Urashima, Konan (JP)

(73) Assignee: NGK Spark Plug Co., Ltd., Aichi (JP)

( * ) Notice: Subject to any disclaimer, the term of this patent is extended or adjusted under 35 U.S.C. 154(b) by 103 days.

(21) Appl. No.: 12/438,836

(22) PCT Filed: Aug. 29, 2007

(86) PCT No.: PCT/JP2007/066774
§ 371 (c)(1),
(2), (4) Date: Feb. 25, 2009

(87) PCT Pub. No.: WO2008/026641
PCT Pub. Date: Mar. 6, 2008

(65) Prior Publication Data
US 2009/0197073 A1    Aug. 6, 2009

(30) Foreign Application Priority Data

Aug. 30, 2006 (JP) ................................. 2006-234141
Aug. 30, 2006 (JP) ................................. 2006-234142

(51) Int. Cl.
*C04B 35/569* (2006.01)
*C04B 35/599* (2006.01)
*C04B 35/117* (2006.01)

(52) U.S. Cl. ......... 501/92; 501/98.2; 501/98.3; 501/128
(58) Field of Classification Search ............ 501/89, 501/92, 98.2, 98.3, 128
See application file for complete search history.

(56) References Cited

U.S. PATENT DOCUMENTS

| 4,889,835 A | 12/1989 | Niihara et al. |
| 5,455,212 A * | 10/1995 | Das Chaklader et al. ........ 501/89 |
| 6,753,284 B2 * | 6/2004 | Yamamoto et al. ........... 501/127 |

FOREIGN PATENT DOCUMENTS

| EP | 1 279 650 A1 | 1/2003 |
| JP | 58104069 A | 6/1983 |
| JP | 58-176174 A | 10/1983 |
| JP | 58176174 A | 10/1983 |
| JP | 62012670 A | 1/1987 |
| JP | 05-295352 A | 11/1993 |
| JP | 07-053256 A | 2/1995 |
| JP | 753256 A | 2/1995 |
| JP | 07-082047 A | 3/1995 |

(Continued)

OTHER PUBLICATIONS

Z.H. Huang, et al.; "β-Sialon-Al$_2$O$_3$-SiC Composite Refractories"; Trans Tech Publications Ltd.; Switzerland; Key Engineering Materials; vol. 224-226; Jan. 1, 2002; pp. 275-279; XP008127612.

(Continued)

*Primary Examiner* — Karl E Group
(74) *Attorney, Agent, or Firm* — Sughrue Mion, PLLC

(57) ABSTRACT

A cutting insert 1 is made of an aluminum oxide-based composite sintered body constituted by a ternary ceramic material including aluminum oxide, silicon carbide, and a sialon. The sialon in the aluminum oxide-based composite sintered body is Si—Al—O—N as defined by JCPDS No. 32-0026 in X-ray diffraction analysis.

20 Claims, 3 Drawing Sheets

| FOREIGN PATENT DOCUMENTS | | | |
|---|---|---|---|
| JP | 7080708 | A | 3/1995 |
| JP | 2507479 | B2 | 6/1996 |
| JP | 2511696 | B2 | 7/1996 |
| JP | 2979703 | B2 | 11/1999 |

OTHER PUBLICATIONS

Extended European Search Report dated Dec. 16, 2010 for EP 07 80 6251.

* cited by examiner

ALUMINA, SILICON CARBIDE, SIALON

ALUMINUM OXIDE-BASED COMPOSITE
SINTERED BODY AND CUTTING INSERT

TECHNICAL FIELD

The present invention relates to an aluminum oxide-based composite sintered body and a cutting insert having high toughness and high strength which can be used for, for example, a throwaway tip for cutting cast iron or the like.

BACKGROUND ART

Heretofore, alumina-SiC composite materials and the like have been developed as materials for cutting inserts, such as throwaway tips (see Patent Documents 1 and 2).

Also, there have been proposed a method for using SiC whisker (see Patent Document 3) and a microparticulation technique by third phase addition (addition of $TiB_2$) (see Patent Document 4), in order to achieve high strength and high toughness of alumina-SiC composite materials.
Patent Document 1: Japanese Examined Patent Publication No. 7-80708
Patent Document 2: Japanese Patent Publication No. 2511696
Patent Document 3: Japanese Patent Publication No. 2507479
Patent Document 4: Japanese Patent Publication No. 2979703
Patent Document 5: Japanese Unexamined Patent Publication No. 58-104069
Patent Document 6: Japanese Unexamined Patent Publication No. 62-012670

DISCLOSURE OF THE INVENTION

Problems to be Solved by the Invention

The techniques described in Patent Document 1 to Patent Document 3, involve problems that SiC whisker is expensive and that addition of SiC whisker leads to deterioration of sinterability of alumina due to a self-forming property of the whisker, thereby requiring sintering at a high temperature for a long time to achieve densification and causing reduction in strength due to growth of alumina particles.

Also, since SiC whisker and alumina have significantly different thermal expansion coefficients, gaps tend to be formed at interfaces between SiC whisker and alumina, and the gaps may cause reduction in strength. In this respect, Patent Document 6 describes a problem that when SiC whisker and alumina have different thermal expansion coefficients, gaps are formed and cause reduction in strength.

A technology of sintering without forming gaps by pressure sintering is disclosed in, for example, Patent Document 5. However, in a material produced by the technology, interfacial surfaces of SiC whisker and alumina are not chemically bonded firmly. Thus, the material cannot satisfy the demand for further improvement in strength.

A technology disclosed in Patent Document 4 involves a problem that a poor wettability of $TiB_2$ to be added with alumina leads to deterioration of sinterability of alumina, thereby requiring sintering at a high temperature for a long time to achieve densification, which results in reduction in strength due to growth of alumina particles.

The present invention, which has been made in view of the above-described problems, has an object to provide an aluminum oxide-based composite sintered body having high toughness and high strength, and a cutting insert.

Means for Solving the Problems

The present invention was made by the inventors who found in their research that a composite sintered body having high toughness and high strength can be obtained by dispersion and compounding process of fine particles of SiC and a specific sialon in a sintered body containing alumina as a matrix. A description thereof will be provided hereinafter.

(1) An invention of a first aspect (an aluminum oxide-based composite sintered body) is constituted by a ceramic material, including aluminum oxide, silicon carbide and a sialon, wherein the sialon is Si—Al—O—N as defined by JCPDS No. 32-0026 in X-ray diffraction analysis.

According to the present invention, high toughness and high strength can be achieved, as shown in later-described experimental examples, since the aluminum oxide-based composite sintered body is constituted by a ceramic material, including aluminum oxide, silicon carbide and a sialon, wherein the sialon is Si—Al—O—N as defined by JCPDS No. 32-0026 in X-ray diffraction analysis. That is, the present invention may provide an aluminum oxide-based composite sintered body having high toughness and high strength at a low cost without using SiC whisker as in a conventional technique.

Specifically, the strength may be improved, for example, since silicon carbide particles and the above-mentioned sialon particles are uniformly dispersed in the sintered body, and thereby the entire sintered body has a densified structure including multiple fine particles. Also, the toughness may be improved since the sialon particles exist in grain boundaries of alumina particles, and thereby cracks are deflected.

Silicon carbide particles (for example, particles having an aspect ratio of less than 3), which have high sinterability, are preferable as the silicon carbide. Also, when a part of the sialon exists in alumina particles, residual stress is generated by a difference in thermal expansion coefficient between the sialon and alumina particles, and pinning, sealing and/or deflection of a crack tip by the residual stress may further improve toughness.

(2) An invention of a second aspect (an aluminum oxide-based composite sintered body) is constituted by a ceramic material, including aluminum oxide, silicon carbide and a sialon, wherein the sialon is Si—Al—O—N as defined by JCPDS No. 32-0026 in X-ray diffraction analysis, wherein a content of the silicon carbide is from more than 5 mass % to 30 mass % or less, and wherein an aspect ratio obtained by dividing a long-axis length of the silicon carbide by a short-axis diameter is less than 3.

According to the present invention, high toughness and high strength can be achieved, since the aluminum oxide-based composite sintered body is constituted by a ceramic material, including aluminum oxide, silicon carbide and a sialon, wherein the sialon is Si—Al—O—N as defined by JCPDS No. 32-0026 in X-ray diffraction analysis the same as in the invention of the first aspect. That is, the present invention may provide an aluminum oxide-based composite sintered body having high toughness and high strength at a low cost.

Specifically, for example, the strength may be improved since silicon carbide particles and the sialon particles are uniformly dispersed in the sintered body, and thereby the entire sintered body has a densified structure including a lot of fine particles. Also, the toughness may be improved since the sialon particles exist in grain boundaries of alumina particles, and thereby cracks are deflected. Further, when a part of the sialon exists in alumina particles, toughness may be further improved.

Especially in the present invention, the content of the silicon carbide of more than 5 mass % leads to high toughness and the content of the silicon carbide of 30 mass % or less leads to sufficient sinterability. Also since the aspect ratio obtained by dividing a long-axis length of the silicon carbide by a short-axis diameter (diameter) is less than 3, sufficient sinterability may be ensured. In other words, silicon carbide particles having the aspect ratio less than 3 may be added up to a sufficient amount to achieve high toughness without inhibiting sinterability.

(3) In an invention of a third aspect, the Si—Al—O—N exhibiting a maximum X-ray intensity ratio of 0.01 or more to 0.2 or less is included.

According to the present invention, since the maximum X-ray intensity ratio is 0.01 or more, the Si—Al—O—N may be sufficiently dispersed in the sintered body, and thus an effect of increasing fracture toughness may be great. Also, since the maximum X-ray intensity ratio is 0.2 or less, the sinterability of alumina is unlikely to be inhibited, and thus a densified sintered body may be obtained.

Here, the maximum X-ray intensity ratio of the Si—Al—O—N is defined as below.

A peak intensity of a diffraction line attributable to alumina ($\alpha$-$Al_2O_3$: Corundum) as a matrix of the sintered body with an interplanar spacing d(Å)=2.5520 (diffraction angle 2θ=35.136°) and a Miller index of (104) is defined as "1". Then, a relative peak intensity of the Si—Al—O—N as defined by JCPDS No. 32-0026 with an interplanar spacing d(Å)=2.7840 (diffraction angle 2θ=32.124°) and a Miller index of (0015) is calculated and is used as "a maximum X-ray intensity ratio" of the Si—Al—O—N.

(4) In an invention of a fourth aspect, the Si—Al—O—N exists at interfaces between the silicon carbide and the aluminum oxide.

According to the present invention, since the Si—Al—O—N exists at interfaces between the silicon carbide and the aluminum oxide, a bondability between the silicon carbide and the aluminum oxide may be high, and thus excellent breakage resistance and wear resistance may be achieved.

In the sintered body, the Si—Al—O—N exists mainly at interfaces between the silicon carbide and the aluminum oxide.

(5) In an invention of a fifth aspect, the sialon further includes $Si_3Al_3O_3N_5$ as defined by JCPDS No. 36-1333 in the X-ray diffraction analysis.

According to the present invention, since the sialon further includes $Si_3Al_3O_3N_5$ as defined by JCPDS No. 36-1333 in addition to the Si—Al—O—N as defined by JCPDS No. 32-0026, further excellent strength and toughness may be achieved.

(6) In an invention of a sixth aspect, the $Si_3Al_3O_3N_5$ exhibiting a maximum X-ray intensity ratio of 0.01 or more to 0.2 or less is included.

According to the present invention, since the maximum X-ray intensity ratio of the $Si_3Al_3O_3N_5$ is 0.01 or more, the $Si_3Al_3O_3N_5$ may be sufficiently dispersed in the sintered body, and thus an effect of increasing fracture toughness may be great. Also, since the maximum X-ray intensity ratio is 0.2 or less, the sinterability of alumina is unlikely to be inhibited, and thus a densified sintered body may be obtained.

Here, the maximum X-ray intensity ratio of the $Si_3Al_3O_3N_5$ is defined as below.

A peak intensity of a diffraction line attributable to alumina ($\alpha$-$Al_2O_3$: Corundum) as a matrix of the sintered body with an interplanar spacing d(Å)=2.5520 (diffraction angle 2θ=35.136°) and a Miller index of (104) is defined as "1". Then, a relative peak intensity of the $Si_3Al_3O_3N_5$ as defined by JCPDS No. 36-1333 with an interplanar spacing d(Å)=3.3240 (diffraction angle 2θ=26.798°) and a Miller index of (020) is calculated and is used as "a maximum X-ray intensity ratio" of the $Si_3Al_3O_3N_5$.

(7) An invention of a seventh aspect is constituted by the ceramic material, including aluminum oxide, silicon carbide and the sialon; and a Dy compound in grain boundaries, wherein the Dy compound is $Dy_3Al_2(AlO_4)_3$.

According to the present invention, since the aluminum oxide-based composite sintered body, which is constituted by the ceramic material, including aluminum oxide, silicon carbide and the sialon, includes $Dy_3Al_2(AlO_4)_3$ as the Dy compound in grain boundaries, high toughness and high strength may be achieved, as clearly shown by later-described experimental examples.

That is, the present invention may provide an aluminum oxide-based composite sintered body having high toughness and high strength at a low cost without using SiC whisker as in a conventional technique.

Specifically, by including $Dy_3Al_2(AlO_4)_3$ in the grain boundaries of the sintered body containing alumina as a matrix, strength of grain boundary may be increased and strength and toughness of the sintered body may be improved. Such effects may be enhanced by pinning or deflection of cracks especially when $Dy_3Al_2(AlO_4)_3$ is located at a triple point of three components (a point where particles of three types gather).

Also, by including $Dy_3Al_2(AlO_4)_3$ in the grain boundaries, dispersion and compounding process of SiC and the sialon (during sintering) may be enhanced, and thus a sintered body having high toughness and high strength may be obtained.

Further, the $Dy_3Al_2(AlO_4)_3$ provides an effect of enhancing sintering while suppressing growth of alumina particles. When the $Dy_3Al_2(AlO_4)_3$ is included in a large amount, fracture toughness may be improved.

(8) In an invention of an eighth aspect, an average particle diameter of the sialon is 3 μm or less.

According to the present invention, since the average particle diameter of the sialon is 3 μm or less, an effect of suppressing growth of crystal particles among alumina particles may be brought about. Accordingly, a refined crystal structure may be obtained, and thus strength and fracture toughness may be improved.

To obtain the above effect, the sialon preferably has an average particle diameter of 1 μm or more. Also, the sialon is preferably uniformly dispersed to enhance the above effect.

(9) In an invention of a ninth aspect, a fracture toughness value $K_{IC}$ is 4.0 or more.

Since the present invention exhibits a high fracture toughness, as clearly shown by the later-described experimental examples, a cutting insert, for example, to which the present invention is applied is preferable since resistance to breakage and long life may be achieved. The fracture toughness value $K_{IC}$ is defined by a later-described Equation (1).

(10) An invention of a tenth aspect provides a cutting insert which is constituted by the aluminum oxide-based composite sintered body as described in any one of the first to ninth aspects.

The present invention exemplifies a cutting insert which is constituted by the aluminum oxide-based composite sintered body. Since the cutting insert of the present invention has high strength and high toughness, and thus has resistance to breakage and long life, processing of cast iron, for example, may be performed in a preferable manner using the cutting insert.

In a case of manufacturing the above-described aluminum oxide-based composite sintered body, it is preferable to generate the sialon in-situ (i.e., generate the sialon through reactions in the manufacturing process), as described later in detail, by sintering a pressed body made of mixed powders of α-alumina and silicon carbide having an average particle diameter of less than 4 μm (more preferably 3 μm or less) in an $N_2$ atmosphere. This may cause fine sialon to be uniformly dispersed in the sintered body.

When the silicon carbide raw material has an average particle diameter of 4 μm or more, sialon exhibiting a maximum X-ray intensity ratio of 0.01 or more is not generated even in an $N_2$ atmosphere. Also, even when the silicon carbide raw material has an average particle diameter of less than 4 μm, sialon is not generated when the sintering is performed in an Ar atmosphere.

Further, it is preferable that $Dy_3Al_2(AlO_4)_3$ is generated in-situ in a same manner as sialon. This may cause fine $Dy_3Al_2(AlO_4)_3$ to be uniformly dispersed in the sintered body. It is to be noted that $Dy_3Al_2(AlO_4)_3$ is not generated when the silicon carbide raw material has an average particle diameter of less than 1 μm.

Accordingly, in case of generating both $Dy_3Al_2(AlO_4)_3$ and sialon, it is desirable that the silicon carbide raw material has an average particle diameter of 1 μm or more to 3 μm or less and $Dy_3Al_2(AlO_4)_3$ and sialon are generated in-situ while sintering is performed in an $N_2$ atmosphere.

EXPLANATION OF REFERENCE NUMERALS

1 . . . cutting insert
3 . . . holder

BEST MODE FOR CARRYING OUT THE INVENTION

An embodiment of the present invention will be described hereinafter with reference to the drawings.

Embodiment

A cutting insert (a throwaway tip) used for cutting iron cast or the like is taken here as an example of an embodiment of an aluminum oxide-based composite sintered body according to the present invention.

a) First, a cutting insert of the present embodiment will be described.

Figure 1:
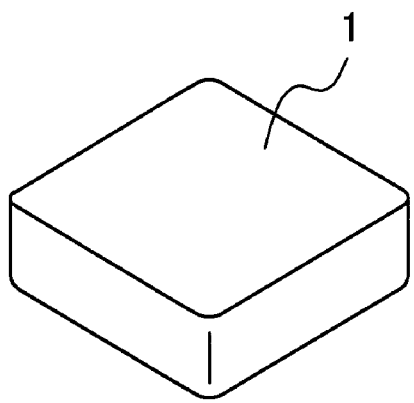
FIG. 1 is a perspective view of a cutting insert in an embodiment.

As shown in FIG. 1, a cutting insert 1 of the present embodiment is a tip (for example, ISO Standards SNGN432) made of an aluminum oxide-based composite sintered body including aluminum oxide as a main component and having a substantially square plate-like shape when seen from a plate thickness direction (from a rake face side).

Specifically, the cutting insert 1 of the present embodiment is constituted by a ternary ceramic material (i.e., a ternary sintered body including aluminum oxide as a main component) of aluminum oxide (α-alumina), silicon carbide, and a sialon. The sialon includes Si—Al—O—N as defined by JCPDS No. 32-0026 exhibiting a maximum X-ray intensity ratio of 0.01 or more to 0.2 or less, and also includes $Si_3Al_3O_3N_5$ as defined by JCPDS No. 36-1333 exhibiting a maximum X-ray intensity ratio of 0.01 or more to 0.2 or less.

Also, the sialon, which is granular and has an average particle diameter of 1 μm or more to 3 μm or less, is substantially uniformly dispersed in the sintered body. In addition to the sialon, the silicon carbide is in the state of particles (silicon carbide particles having an aspect ratio of less than 3) and is substantially uniformly dispersed in the sintered body. More specifically, the sialon exists mainly at interfaces (in grain boundaries) between the aluminum oxide and the silicon carbide.

Further, the grain boundaries include a Dy compound, $Dy_3Al_2(AlO_4)_3$, which is substantially uniformly dispersed in the sintered body.

The cutting insert 1 of the present embodiment having high strength and high toughness specifically has a fracture toughness value $K_{IC}$ of 4.0 or more.

Figure 2:
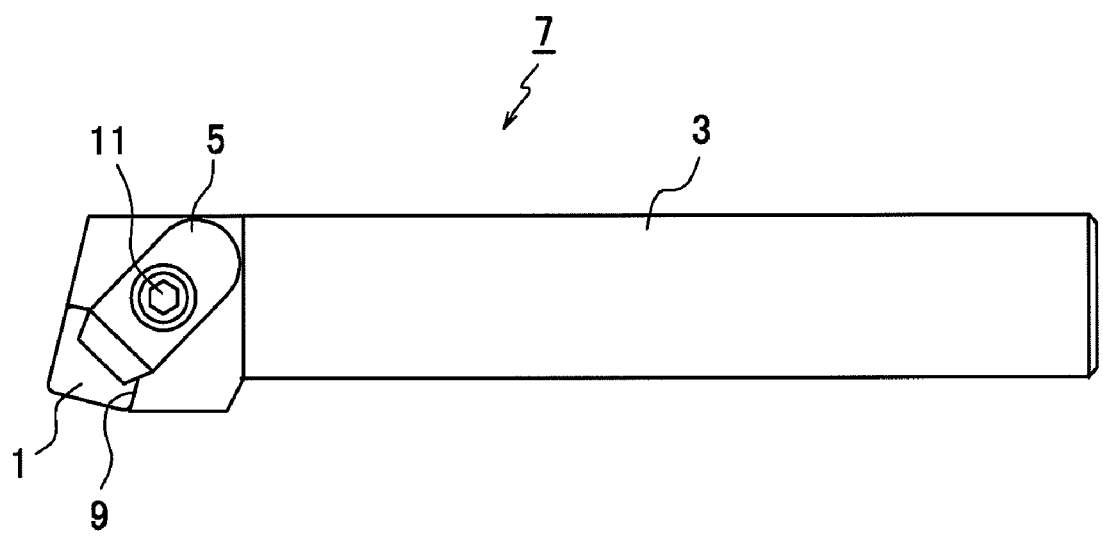
FIG. 2 is an explanatory view showing a cutting tool including the cutting insert in the embodiment attached to a holder.

As shown in FIG. 2, the cutting insert 1 is attached to a steel holder 3 using a known clamp part 5. A tool including the cutting insert 1 attached to the holder 3 is referred to as a cutting tool 7.

Specifically, an attachment recess 9 cut out so as to match an outer shape of the cutting insert 1 is provided at an end of the holder 3, and the cutting insert 1 is fitted into the attachment recess 9. The clamp part 5 is attached on an end side of the holder 3 such that the clamp part 5 covers a part of an upper surface of the cutting insert 1. By tightening the clamp part 5 with a screw 11, the cutting insert 1 is pressed and fixed by the clamp part 5.

A coating layer may be provided on a surface of the cutting insert 1. The coating layer may be a single layer or multiple layers formed of at least one selected from an oxide, nitride, carbide and boride of Al or Ti, and a mutual solid solution thereof.

b) Manufacturing method of the cutting insert 1 will next be described.

First, α-$Al_2O_3$ powder having an average particle diameter of 0.4 μm as an alumina raw material powder, α-SiC powder having an average particle diameter of 1.0 μm or more to 1.2 μm or less as a carbide raw material powder, and dysprosium oxide ($Dy_2O_3$) powder having an average particle diameter of 0.8 μm and a purity of 99.9% were used. A mixture of these powders was mixed with ethanol or water as a dispersion medium in an alumina ball mill for 24 hours, and an obtained slurry was dried sufficiently to be provided as a raw material powder.

Next, the raw material powder was pressed, and the pressed body was thermally treated at 1,600-1,800° C. for 1 hour in an $N_2$ atmosphere of an atmospheric pressure or a pressure of approximately 0.3 MPa, and also was HIP-treated at a temperature of 1,500° C. for 1 hour in an Ar atmosphere of 100 MPa. Thus, an aluminum oxide-based composite sintered body was obtained. The obtained sintered body was dense, having a porosity of 1% or less.

Subsequently, surfaces of the obtained aluminum oxide-based composite sintered body were ground and polished to form a predetermined shape of a cutting insert (ISO SNGN432), and thereby the cutting insert 1 of the present embodiment was provided.

In case of forming a coating layer on the surfaces of the cutting insert 1, chemical vapor deposition method is preferably employed. However, any other methods may also be employed.

Accordingly, the cutting insert 1 of the present embodiment, which is suitably sintered without inhibiting the sinterability of alumina as clearly shown by experimental examples described later in detail, have features of low cost and high strength and high toughness.

Also, since $Dy_3Al_2(AlO_4)_3$ and the sialon included in the sintered body are generated in-situ using reactions in the manufacturing process of the aluminum oxide-based composite sintered body, advantages in cost and uniform dispersion may be achieved.

Experimental Example

Next, an experimental example performed to confirm effects brought by the aluminum oxide-based composite sintered body of the present invention will be described.

(1) Manufacturing Method of Aluminum Oxide-Based Composite Sintered Bodies to be Used in the Experiment Raw material powders having respective compositions shown in Table 1 below were prepared in accordance with the above described manufacturing method, and aluminum oxide-based composite sintered bodies of invented samples (Examples) Nos. 1-11 and comparative samples (Comparative Examples) Nos. 1-9 to be used in the experiment were produced under conditions indicated in Table 1.

Here, an alumina raw material powder had an average particle diameter of 0.4 μm, and a sintering atmosphere was an atmosphere during a thermal treatment before a HIP treatment. In Comparative Example No. 5, Ar sintering atmosphere was used.

Particle diameters and aspect ratios of respective silicon carbide raw material powders were average values, and powders having respective features indicated in Table 2 below were selected and used. The average values of particle diameters and aspect ratios of the raw material powders were obtained from SEM photographs.

(2) Evaluation of Sintered Body of Each Sample
Measurement of Maximum X-Ray Intensity Ratio Maximum X-ray intensity ratios of Si—Al—O—N (as defined by JCPDS No. 32-0026), $Si_3Al_3O_3N_5$ (as defined by JCPDS No. 36-1333) and $Dy_3Al_2(AlO_4)_3$ were obtained with respect to each of the samples by X-ray diffraction analysis. Table 2 shows obtained results. It is to be noted that the maximum X-ray intensity ratio of $Dy_3Al_2(AlO_4)_3$ is defined as below.

A peak intensity of a diffraction line attributable to alumina (α-$Al_2O_3$: Corundum) as a matrix of the sintered body with an interplanar spacing d(Å)=2.5520 (diffraction angle 2θ=35.136°) and a Miller index of (104) is defined as "1".

Then, a relative peak intensity of the $Dy_3Al_2(AlO_4)_3$ as defined by JCPDS No. 22-1093 with an interplanar spacing d(Å)=2.6900 (diffraction angle 2θ=33.279°) and a Miller index of (420) is calculated and is used as "a maximum X-ray intensity ratio" of the $Dy_3Al_2(AlO_4)_3$.

Figure 3:
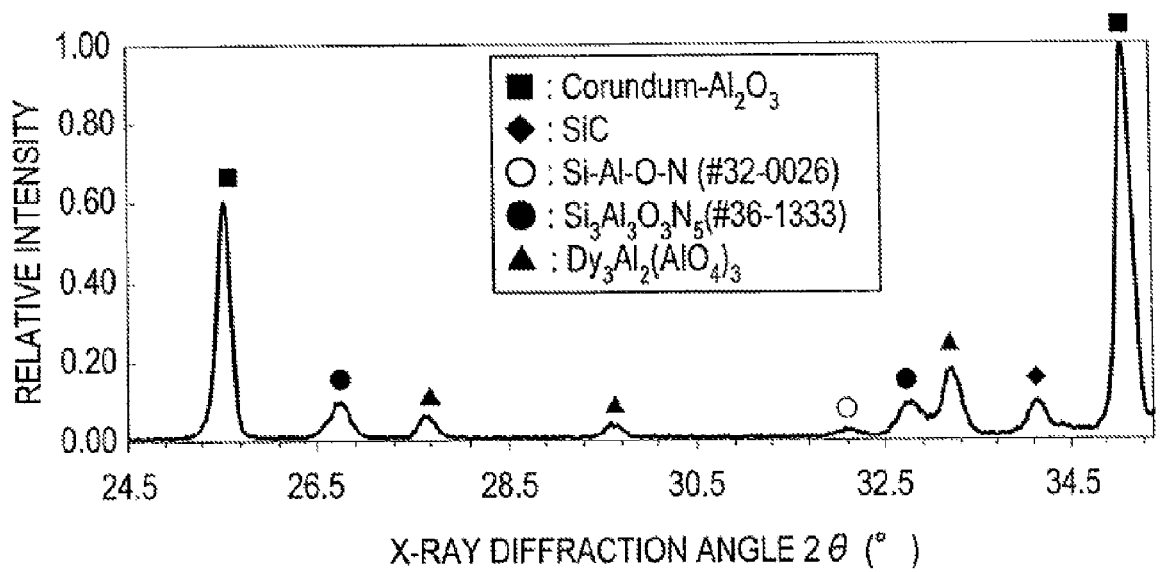
FIG. 3 is a graph showing an X-ray diffraction measurement result of Example No. 2.
Figure 4:
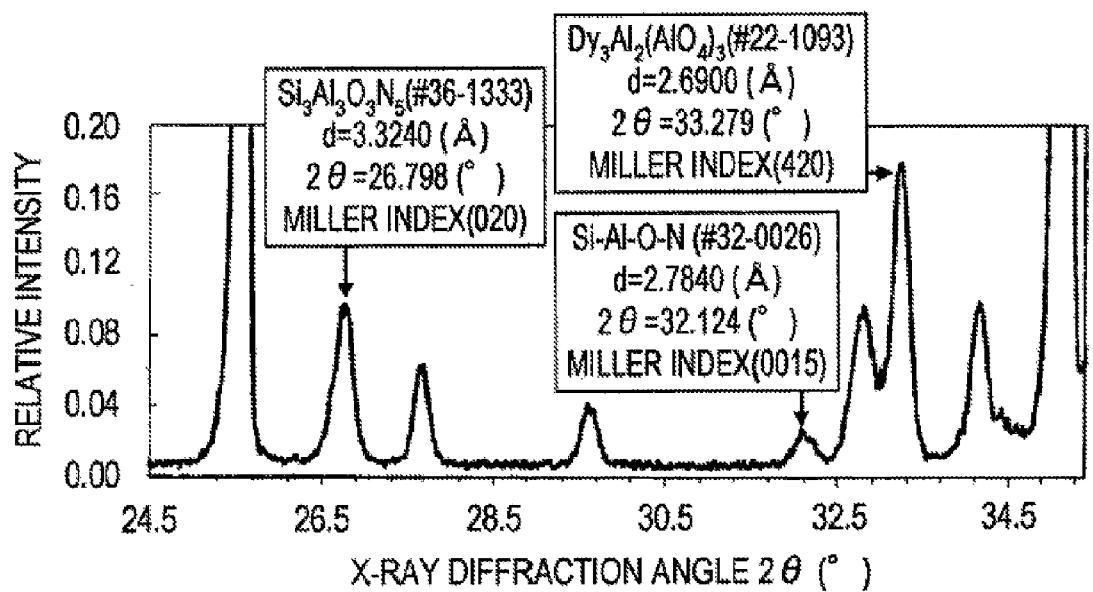
FIG. 4 is a graph showing the X-ray diffraction measurement result of Example No. 2 with an enlarged scale of Y-axis.

FIG. 3 shows an X-ray diffraction measurement result of Example No. 2, and FIG. 4 shows a graph of the measurement result with an enlarged scale of Y-axis.

Measurement of Particle Diameter (Average Particle Diameter)

Average diameters of the sintered bodies were measured by observation with an electron probe microanalyzer (EPMA). Measurement results are shown in Table 2.

Figure 5:
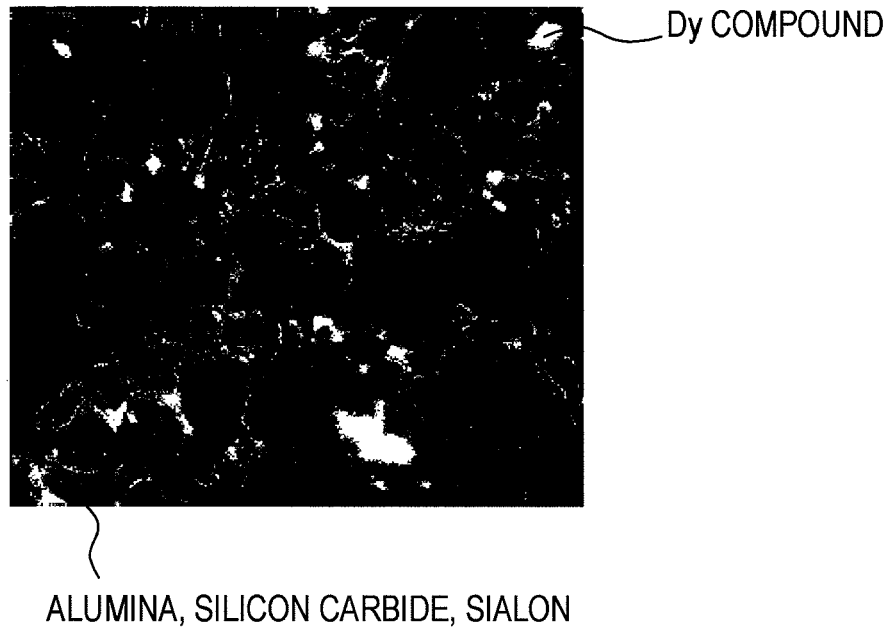
FIG. 5 is an SEM photograph of a polished surface of Example No. 2.

FIG. 5 shows a photograph of a polished surface of Example No. 2 observed by an SEM (a photograph treated to highlight the Dy compound: magnification 8000×), in which white areas indicate the Dy compound, ($Dy_3Al_2(AlO_4)_3$), and black areas indicate alumina, silicon carbide and the sialon. This photograph shows that the Dy compound is uniformly dispersed in the sintered body. Existence of the Dy compound in the grain boundaries is obvious since the Dy compound does not exist in alumina, silicon carbide and the sialon, i.e., the black areas.

Figure 6:
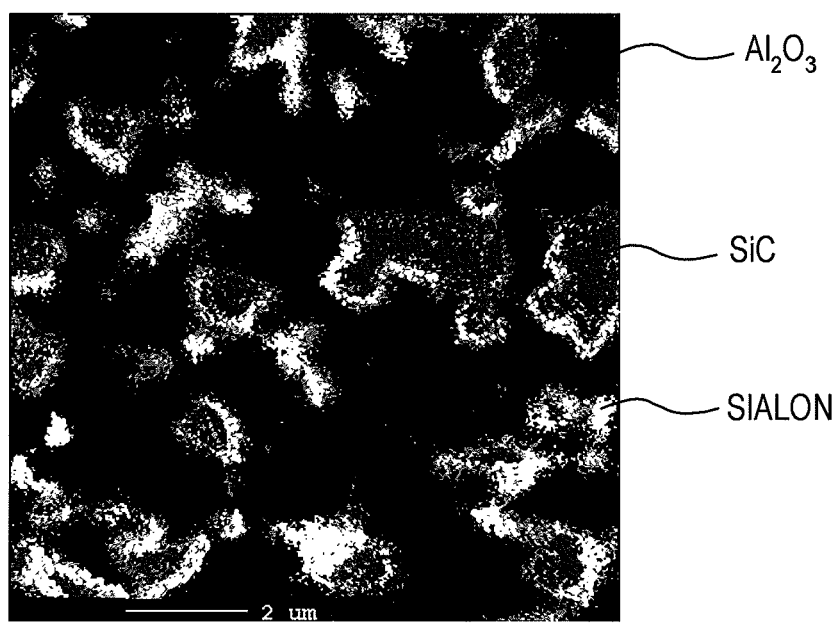
FIG. 6 is an EPMA photograph of a polished surface of Example No. 2.

Further, FIG. 6 shows a photograph of a polished surface of Example No. 2 observed by an EPMA (a photograph treated to allow distinction among three components: magnification 10000×), in which black areas indicate alumina as the matrix, gray areas indicate silicon carbide, and white areas indicate the sialon. It can be observed in this photograph that the sialon exists in the grain boundaries in the vicinity of silicon carbide (at interfaces between alumina and silicon carbide) or exists separately from silicon carbide. In either case, it can be observed that the sialon is uniformly dispersed in the sintered body.

Whether or not the sialon (the above mentioned Si—Al—O—N) exists at the interfaces between alumina and silicon carbide is obvious from whether the white areas of the sialon exist between the black areas of alumina and the gray areas of silicon carbide.

Measurement of Fracture Toughness Values

Fracture toughness values $K_{IC}$ were measured by an indentation fracture method. Measurement results are shown in Table 2 below. The fracture toughness values $K_{IC}$ are calculated by the following Equation (1), $$KIC = 0.042 E^{0.4} P^{0.6} a^{0.8} / C^{1.5} \quad (1)$$

wherein
KIC: fracture toughness value [Pa·√m]
E: Young's modulus [Pa]
P: load [N]
a: half of an average diagonal length of indentation [m]
C: half of an average crack length [m].

Measurement of Strength

Three-point bending strength at room temperature was measured by JIS-R1601. Measurement results are shown in Table 2 below.

TABLE 1

| | | Blending Composition [mass %] Remainder: $Al_2O_3$ Inevitable Impurities | Silicon Carbide Raw Material Powder Particle Diameter [μm] | Aspect Ratio | Sintering Atmosphere |
|---|---|---|---|---|---|
| Example | 1 | 10% SiC—1% $Dy_2O_3$ | 1.5 | 1.8 | $N_2$ atmospheric pressure |
| | 2 | 15% SiC—2% $Dy_2O_3$ | 1.2 | 1.8 | $N_2$ atmospheric pressure |
| | 3 | 20% SiC—4% $Dy_2O_3$ | 1.5 | 1.8 | $N_2$ atmospheric pressure |

TABLE 1-continued

|  |  | Blending Composition [mass %] Remainder: Al$_2$O$_3$ Inevitable Impurities | Silicon Carbide Raw Material Powder Particle Diameter [μm] | Aspect Ratio | Sintering Atmosphere |
|---|---|---|---|---|---|
|  | 4 | 25% SiC—4% Dy$_2$O$_3$ | 1.2 | 1.8 | N$_2$ atmospheric pressure |
|  | 5 | 15% SiC—2% Dy$_2$O$_3$ | 0.5 | 2.5 | N$_2$ atmospheric pressure |
|  | 6 | 10% SiC—1% Dy$_2$O$_3$ | 1.5 | 1.8 | N$_2$ pressured (0.3 MPa) |
|  | 7 | 15% SiC—2% Y$_2$O$_3$ | 1.5 | 1.8 | N$_2$ atmospheric pressure |
|  | 8 | 15% SiC—2% Dy$_2$O$_3$ | 2.5 | 1.6 | N$_2$ atmospheric pressure |
|  | 9 | 10% SiC—1% Dy$_2$O$_3$-8% AlN | 1.5 | 1.8 | N$_2$ atmospheric pressure |
|  | 10 | 10% SiC—1% Dy$_2$O$_3$-3% AlN | 1.5 | 1.8 | N$_2$ atmospheric pressure |
|  | 11 | 15% SiC—2% Dy$_2$O$_3$ | 1.5 | 1.8 | N$_2$ pressured (0.3 MPa) |
| Comparative Example | 1 | 5% SiC—1% Dy$_2$O$_3$ | 1.5 | 1.8 | N$_2$ atmospheric pressure |
|  | 2 | 35% SiC—5% Dy$_2$O$_3$ | 1.5 | 1.8 | N$_2$ atmospheric pressure |
|  | 3 | 10% SiC—2% Dy$_2$O$_3$ | 0.5 | 4 | N$_2$ atmospheric pressure |
|  | 4 | 20% SiC—4% Dy$_2$O$_3$ | 0.5 | 4 | N$_2$ atmospheric pressure |
|  | 5 | 15% SiC—2% Dy$_2$O$_3$ | 1.2 | 1.8 | Ar atmospheric pressure |
|  | 6 | 15% SiC—2% Dy$_2$O$_3$ | 1.5 | 1.8 | N$_2$ atmospheric pressure |
|  | 7 | 15% SiC—2% Dy$_2$O$_3$ | 4 | 1.8 | N$_2$ atmospheric pressure |
|  | 8 | 10% SiC—1% Y$_2$O$_3$—10% Si$_3$N$_4$ | 1.5 | 1.8 | N$_2$ atmospheric pressure |
|  | 9 | 10% SiC—1% Y$_2$O$_3$—2% Si$_3$N$_4$ | 1.5 | 1.8 | N$_2$ atmospheric pressure |

TABLE 2

|  |  | Maximum X-ray Intensity Ratio | | | Sialon Average Particle Diameter [μm] | K$_{IC}$ [MPa√m] | Bending Strength [MPa] |
|---|---|---|---|---|---|---|---|
|  |  | Si—Al—O—N | Si$_3$Al$_3$O$_3$N$_5$ | Dy$_3$Al$_2$(AlO$_4$)$_3$ |  |  |  |
| Example | 1 | 0.02 | 0.01 | 0.13 | 3 | 4.2 | 991 |
|  | 2 | 0.02 | 0.1 | 0.18 | 3 | 5.5 | 1116 |
|  | 3 | 0.04 | 0.02 | 0.35 | 2 | 5 | 1110 |
|  | 4 | 0.05 | 0.05 | 0.87 | 2 | 4.8 | 1083 |
|  | 5 | 0.01 | 0.01 | 0.15 | 1 | 4.1 | 982 |
|  | 6 | 0.01 | 0 | 0.14 | 2 | 3.8 | 1020 |
|  | 7 | 0.02 | 0.02 | 0 | 2 | 4.1 | 965 |
|  | 8 | 0.02 | 0 | 0.14 | 3.5 | 4 | 1110 |
|  | 9 | 0.24 | 0 | 0.17 | 2 | 3.8 | 962 |
|  | 10 | 0.07 | 0 | 0.13 | 2 | 4 | 988 |
|  | 11 | 0.04 | 0.02 | 0 | 2 | 4.2 | 985 |
| Comparative Example | 1 | 0 | 0 | 0.1 | — | 3.6 | 820 |
|  | 2 | 0 | 0 | 1 | — | densification impossible | densification impossible |
|  | 3 | 0 | 0 | 0.19 | — | 3.8 | 845 |
|  | 4 | 0 | 0 | 0.56 | — | densification impossible | densification impossible |
|  | 5 | 0 | 0 | 0.15 | — | 3.6 | 837 |
|  | 6 | 0 | 0.12 | 0.17 | 2 | 3.9 | 908 |
|  | 7 | 0 | 0 | 0.14 | — | 3.6 | 833 |
|  | 8 | 0 | 0.3 | 0 | 3 | densification impossible | densification impossible |
|  | 9 | 0 | 0 | 0 | — | 3.6 | 831 |

With respect to Comparative Examples Nos. 2, 4 and 8, it was impossible to perform measurement of $K_{IC}$, a bending test and measurement of the particle diameter of the sialon with the EMPA since densification was impossible.

As clearly shown in Table 2, the sintered bodies within the scope of the present invention (Examples Nos. 1-11), which include the Si—Al—O—N, have higher fracture toughness values and bending strengths and thus are more excellent than Comparative Examples (Samples Nos. 1-9).

It is also shown that when from more than 5 mass % to 30 mass % or less of SiC is included, while other conditions are the same (hereinafter the same is applied), the sintered bodies have higher fracture toughness values and bending strengths, and thus are more excellent (see Example Samples Nos. 1-11 and Comparative Examples Nos. 1 and 2).

It is shown that when the aspect ratio of SiC is less than 3, the sintered bodies have higher fracture toughness values and bending strengths, and thus are more excellent (see Example Samples Nos. 1-11 and Comparative Examples Nos. 3 and 4).

In cases where the maximum X-ray intensity ratio of Si—Al—O—N is within a range from 0.01 or more to 0.2 or less, the sintered bodies have higher toughness and strength, and thus are more preferable than other cases (see Example Samples Nos. 1-8, No. 10 and No. 11, and Comparative Example Samples Nos. 1-9).

Inclusion of Si—Al—O—N is preferable since Si—Al—O—N exists at interfaces between silicon carbide and alumina, and thereby achieves improved toughness and strength (see Example Samples Nos. 1-11 and Comparative Example Samples Nos. 1-9).

The sialon including both Si—Al—O—N and $Si_3Al_3O_3N_5$, which achieves higher toughness and strength, is more preferable than the sialon including only Si—Al—O—N (see Example Samples Nos. 1-5, No. 7 and No. 11, and Comparative Example Samples Nos. 1-9).

$Si_3Al_3O_3N_5$ exhibiting the maximum X-ray intensity ratio within a range from 0.01 or more to 0.2 or less, which achieves higher toughness and strength, is more preferable than other cases (see Example Samples Nos. 1-5, No. 7 and No. 11, and Comparative Example Samples Nos. 1-9).

In cases where $Dy_3Al_2(AlO_4)_3$ is included (for example, Example No. 3), the sintered bodies have higher fracture toughness values and bending strengths and thus are more excellent than other cases (see Example No. 7).

It appears to be because the sintering atmosphere is Ar that Comparative Example No. 5 has lower strength and toughness. Also, it appears to be because the silicon carbide powder has an excessively large particle diameter that Comparative Example No. 7 has lower strength and toughness. It appears to be because SiC is added in a large amount that densification of Comparative Example No. 2 is impossible. It appears to be because SiC has a large aspect ratio and also is added in a large amount that densification of Comparative Example No. 4 is impossible. It appears to be because $Si_3N_4$ is added in a large amount that densification of Comparative Example No. 8 is impossible.

It is to be understood that the present invention should not be limited to the above-described embodiment, but may be practiced in various forms without departing from the scope of the invention.

The invention claimed is:

1. An aluminum oxide-based composite sintered body comprising:
   a ceramic material, including:
     aluminum oxide;
     silicon carbide; and
     a sialon,
   wherein the sialon includes Si—Al—O—N as defined by JCPDS No. 32-0026 in X-ray diffraction analysis exhibiting a maximum X-ray intensity ratio of 0.01 or more to 0.07 or less, and
   wherein the Si—Al—O—N exists at interfaces between the silicon carbide and the aluminum oxide.

2. An aluminum oxide-based composite sintered body comprising:
   a ceramic material, including:
     aluminum oxide;
     silicon carbide; and
     a sialon,
   wherein the sialon includes Si—Al—O—N as defined by JCPDS No. 32-0026 in X-ray diffraction analysis exhibiting a maximum X-ray intensity ratio of 0.01 or more to 0.07 or less,
   wherein a content of the silicon carbide is from more than 5 mass % to 30 mass % or less,
   wherein an aspect ratio obtained by dividing a long-axis length of the silicon carbide by a short-axis diameter is less than 3, and
   wherein the Si—Al—O—N exists at interfaces between the silicon carbide and the aluminum oxide.

3. The aluminum oxide-based composite sintered body according to claim 1, wherein the sialon further includes $Si_3Al_3O_3N_5$ as defined by JCPDS No. 36-1333 in X-ray diffraction analysis.

4. The aluminum oxide-based composite sintered body according to claim 2, wherein the sialon further includes $Si_3Al_3O_3N_5$ as defined by JCPDS No. 36-1333 in X-ray diffraction analysis.

5. The aluminum oxide-based composite sintered body according to claim 3, wherein the $Si_3Al_3O_3N_5$ exhibiting a maximum X-ray intensity ratio of 0.01 or more to 0.07 or less is included.

6. The aluminum oxide-based composite sintered body according to claim 4, wherein the $Si_3Al_3O_3N_5$ exhibiting a maximum X-ray intensity ratio of 0.01 or more to 0.07 or less is included.

7. The aluminum oxide-based composite sintered body according to claim 1, comprising:
   the ceramic material, including aluminum oxide, silicon carbide and the sialon; and
   a Dy compound in grain boundaries,
   wherein the Dy compound is $Dy_3Al_2(AlO_4)_3$.

8. The aluminum oxide-based composite sintered body according to claim 2, comprising:
   the ceramic material, including aluminum oxide, silicon carbide and the sialon; and
   a Dy compound in grain boundaries,
   wherein the Dy compound is $Dy_3Al_2(AlO_4)_3$.

9. The aluminum oxide-based composite sintered body according to claim 1, wherein an average particle diameter of the sialon is 3 μm or less.

10. The aluminum oxide-based composite sintered body according to claim 2, wherein an average particle diameter of the sialon is 3 μm or less.

11. The aluminum oxide-based composite sintered body according to claim 1, wherein a fracture toughness value $K_{IC}$ is 4.0 or more.

12. The aluminum oxide-based composite sintered body according to claim 2, wherein a fracture toughness value $K_{IC}$ is 4.0 or more.

13. A cutting insert made of the aluminum oxide-based composite sintered body according to claim 1.

14. A cutting insert made of the aluminum oxide-based composite sintered body according to claim 2.

15. The aluminum oxide-based composite sintered body according to claim 1, having a porosity of 1% or less.

16. The aluminum oxide-based composite sintered body according to claim 2, having a porosity of 1% or less.

17. The aluminum oxide-based composite sintered body according to claim 1, having a bending strength of 965 MPa or greater.

18. The aluminum oxide-based composite sintered body according to claim 2, having a bending strength of 965 MPa or greater.

19. The aluminum oxide-based composite sintered body according to claim 1, having a bending strength within a range of 965-1116 MPa.

20. The aluminum oxide-based composite sintered body according to claim 2, having a bending strength within a range of 965-1116 MPa.

* * * * *